United States Patent
Ghannam et al.

(10) Patent No.: US 10,352,796 B2
(45) Date of Patent: Jul. 16, 2019

(54) PROTECTIVE COVER FOR PRESSURE SENSOR NOZZLE

(71) Applicant: Ford Global Technologies, LLC, Dearborn, MI (US)

(72) Inventors: Mahmoud Yousef Ghannam, Canton, MI (US); Jayagopal Appukutty, Oakland, MI (US); Kam Hage, Troy, MI (US); Abraham G. Philip, Rochester Hills, MI (US); Paul Kevin Kula, Farmington Hills, MI (US)

( * ) Notice: Subject to any disclaimer, the term of this patent is extended or adjusted under 35 U.S.C. 154(b) by 383 days.

(21) Appl. No.: 14/445,016

(22) Filed: Jul. 28, 2014

(65) Prior Publication Data

US 2016/0025586 A1 Jan. 28, 2016

(51) Int. Cl.
*G01L 19/14* (2006.01)
*G01L 5/00* (2006.01)
*G01L 19/06* (2006.01)

(52) U.S. Cl.
CPC ........ *G01L 5/0052* (2013.01); *G01L 19/0618* (2013.01)

(58) Field of Classification Search
CPC ............ G01L 19/0038; G01L 19/0618; G01L 19/0636; G01L 19/143; G01L 5/0052; G01L 9/147
USPC .................................................. 73/862.381
See application file for complete search history.

(56) References Cited

U.S. PATENT DOCUMENTS

| 3,597,961 | A | * | 8/1971 | Pinkstaff | F15C 1/005 73/37.5 |
| 5,579,212 | A | * | 11/1996 | Albano | H01L 23/562 174/547 |
| 5,811,685 | A | * | 9/1998 | Grudzien, Jr. | G01L 19/0654 73/715 |
| 5,918,263 | A | * | 6/1999 | Thundat | G01N 33/0057 310/306 |
| 6,070,469 | A | * | 6/2000 | Taniguchi | G01L 19/0038 73/715 |
| 6,478,950 | B1 | * | 11/2002 | Peat | G01N 27/38 204/400 |
| 6,807,864 | B2 | * | 10/2004 | Takakuwa | G01L 19/0038 73/700 |
| 7,331,238 | B2 | * | 2/2008 | Wanami | B60R 21/0136 361/283.1 |

(Continued)

FOREIGN PATENT DOCUMENTS

DE 102013110258 A1 4/2014
JP H09311064 A 12/1997

(Continued)

*Primary Examiner* — Freddie Kirkland, III
(74) *Attorney, Agent, or Firm* — Frank Lollo; Neal, Gerber & Eisenberg LLP; James P. Muraff

(57) ABSTRACT

Systems and methods are provided for preventing foreign objects from entering a nozzle of a pressure sensor. Example pressure sensor assemblies include a housing for a pressure sensor, a nozzle coupled to the housing and configured to permit airflow into the housing, and a nozzle cover including a plurality of surface openings configured to permit airflow into the nozzle. Other example assemblies include a shield enclosing a nozzle of the pressure sensor, the shield including a plurality of surface openings to permit airflow into the nozzle, and an attachment mechanism configured to couple the shield to an open end of the nozzle.

20 Claims, 4 Drawing Sheets

(56) References Cited

U.S. PATENT DOCUMENTS

| | | | | |
|---|---|---|---|---|
| 7,380,458 B1* | 6/2008 | Date | G01D 11/245 | 180/274 |
| 7,454,976 B2* | 11/2008 | Wanami | B60R 21/0136 | 361/283.1 |
| 7,600,432 B2* | 10/2009 | Nomura | G01L 13/025 | 73/706 |
| 7,765,866 B2* | 8/2010 | Uchida | G01L 19/0038 | 73/270 |
| 7,882,744 B2* | 2/2011 | Kurtz | G01L 9/0054 | 73/727 |
| 8,132,444 B2* | 3/2012 | Cloutier | G01N 1/2202 | 73/23.31 |
| 8,196,476 B2* | 6/2012 | Kurtz | G01L 9/0054 | 73/727 |
| 8,371,160 B2* | 2/2013 | Kwa | G01L 19/0636 | 73/147 |
| 8,707,783 B2* | 4/2014 | Ludwig | G01D 11/245 | 73/431 |
| 9,470,595 B2* | 10/2016 | Ramsay | G01L 19/0069 | |
| 9,573,544 B1* | 2/2017 | Ghannam | G01L 19/0636 | |
| 2001/0029786 A1* | 10/2001 | Takakuwa | G01L 19/0038 | 73/706 |
| 2007/0068276 A1* | 3/2007 | Wanami | G01L 19/0636 | 73/818 |
| 2007/0089520 A1* | 4/2007 | Wanami | B60R 21/0136 | 73/700 |
| 2010/0257938 A1* | 10/2010 | Kurtz | G01L 9/0054 | 73/727 |
| 2011/0126634 A1* | 6/2011 | Kurtz | G01L 9/0054 | 73/727 |
| 2011/0138900 A1* | 6/2011 | Kwa | G01L 19/0636 | 73/147 |
| 2013/0008542 A1* | 1/2013 | Irwin | F16K 31/402 | 137/859 |
| 2014/0260519 A1* | 9/2014 | Hurst | G01L 27/002 | 73/1.57 |
| 2016/0209289 A9* | 7/2016 | Hurst | G01L 27/002 | |

FOREIGN PATENT DOCUMENTS

| | | |
|---|---|---|
| JP | 2006105853 A | 4/2006 |
| JP | 2009145191 A | 7/2009 |
| JP | 2010084591 A | 4/2010 |

\* cited by examiner

PROTECTIVE COVER FOR PRESSURE SENSOR NOZZLE

TECHNICAL FIELD

This application generally relates to pressure sensors and more specifically, to covers for pressure sensor nozzles.

BACKGROUND

As is well know, a pressure sensor measures pressure, such as air pressure or liquid pressure, and generates a signal as a function of the pressure imposed. Pressure sensors are used for control and monitoring in thousands of everyday applications, such as, for example, home appliances, air conditioners, medical devices, aerospace, general industry, and automotive vehicles. In automotive vehicles, for example, pressure sensors can be included in the anti-theft system to detect a broken window, in the crash module to predict the severity of an impact and the need for airbag deployment, in tires to determine whether tire pressure is dangerously low, in the engine compartment to achieve optimal engine conditions, in the emission control system to help protect the environment from noxious emissions from the fuel tank, and other areas.

FIGS. 1A and 1B depict a conventional pressure sensor assembly 100 placed in existing automotive vehicles for detecting a side impact. The pressure sensor (not shown) included within the assembly 100 detects a side impact if the change in pressure between ambient conditions and crash conditions exceeds a predetermined threshold. Upon detecting an impact, the pressure sensor sends a signal to the Restraint Crash Module (RCM) to deploy the airbags. To ensure timely and effective deployment, the pressure sensor can be designed to have a short response time from impact detection to airbag deployment, such as, for example, six to ten milliseconds (ms).

As shown in FIG. 1A, the pressure sensor assembly 100 includes a housing 102 for the pressure sensor and a nozzle 104 coupled to the housing 102. The nozzle 104 includes an open end 106 for permitting airflow into the housing 102 and to the pressure sensor. A predetermined minimum amount of airflow is required through the nozzle in order to produce effective pressure changes that can be measured by the pressure sensor. FIG. 1B shows a cross-sectional view of the pressure sensor assembly 100 along the indicated axis. A printed circuit board (PCB) 108 is disposed within the housing 102 below the nozzle 104. The assembly 100 can further include a small port (not shown) between the nozzle 104 and the PCB 108 for allowing airflow from the nozzle 104 to the PCB 108. The dimensions of the nozzle 104 and the small port can be specifically configured to produce the minimum air flow rate required for operation of the pressure sensor.

Incidentally, certain types of ants, such as, for example, raspberry crazy ants (also known as tawny crazy ants), are especially attracted to electrical equipment, including that found in automotive vehicles, air conditioning units, home appliances, and the like. Moreover, ants appear to be particularly attracted to the pressure sensors included in such electrical equipment for a number of possible reasons. For starters, the ants may be attracted by the opening and/or geometry of the pressure sensor nozzle and the airflow therethrough because it appears to resemble ant tunnels and paths in natural ground. For example, a typical nozzle opening may be about eight millimeters by six millimeters (mm), which provides ample space for the passage of small ants, such as the raspberry crazy ants that are typically 1.5-2.0 mm wide. In addition, ants may be attracted to the silicon gel material placed inside pressure sensors for insulation. For example, the silicon gel is typically placed over a heat source, such as the sensing electronic circuit (e.g., the PCB 108), and the temperature of this sensing circuitry appears to be close to the ants comfort zone temperature.

Once inside the pressure sensor, the ants may use the silicon gel for nesting and consumption and in the process, can become electrocuted. Accumulation of dead ants and nest debris within the pressure sensor can damage the electronic circuitry by, for example, causing short circuits, wire corrosion, overheating, and/or related mechanical failures. In vehicle crash modules, such damage can cause a disruption in communication between the pressure sensor and the RCM, which can lead to certain anomalies. Further, the presence of ants within the pressure sensor, including the nozzle and the small port inside the housing, can interrupt the airflow rate required for pressure sensor performance.

SUMMARY

This application is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

One example embodiment provides a pressure sensor assembly comprising a housing for a pressure sensor, a nozzle coupled to the housing and configured to permit airflow into the housing, and a nozzle cover including a plurality of surface openings configured to permit airflow into the nozzle.

Another example embodiment provides an assembly for protecting a pressure sensor. The assembly comprises a shield enclosing a nozzle of the pressure sensor, the shield including a plurality of surface openings to permit airflow into the nozzle, and an attachment mechanism configured to couple the shield to an open end of the nozzle.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
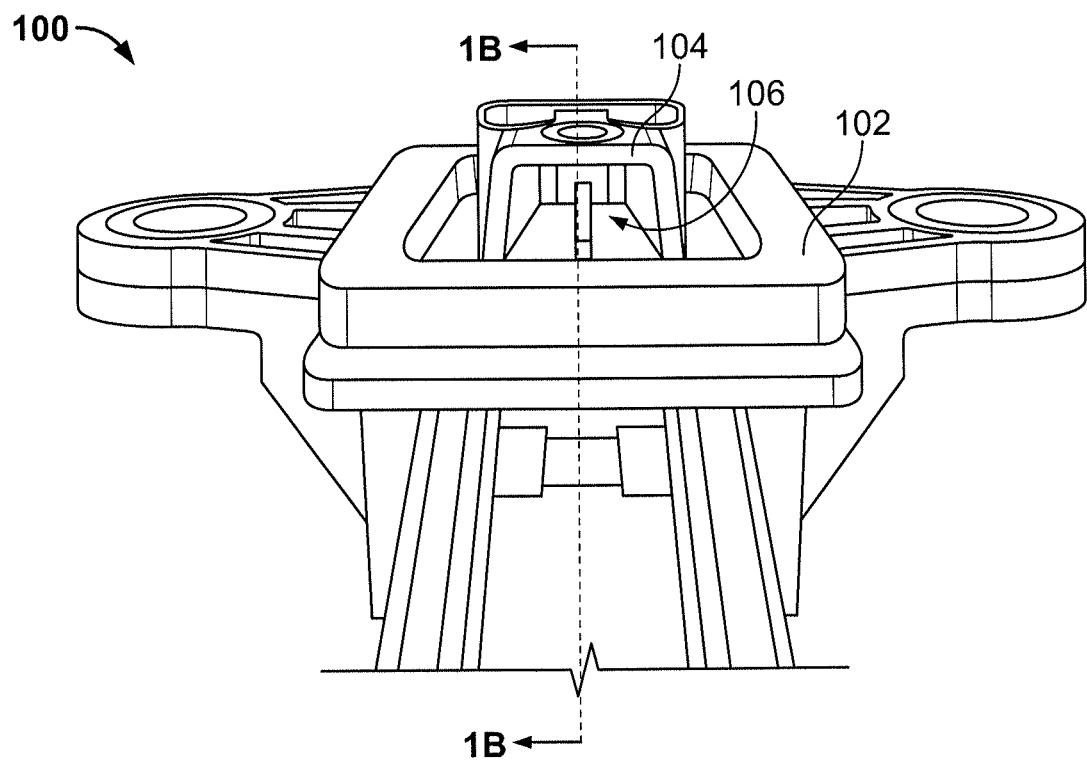
FIG. 1A depicts a front side view of a conventional pressure sensor assembly.
Figure 1B:
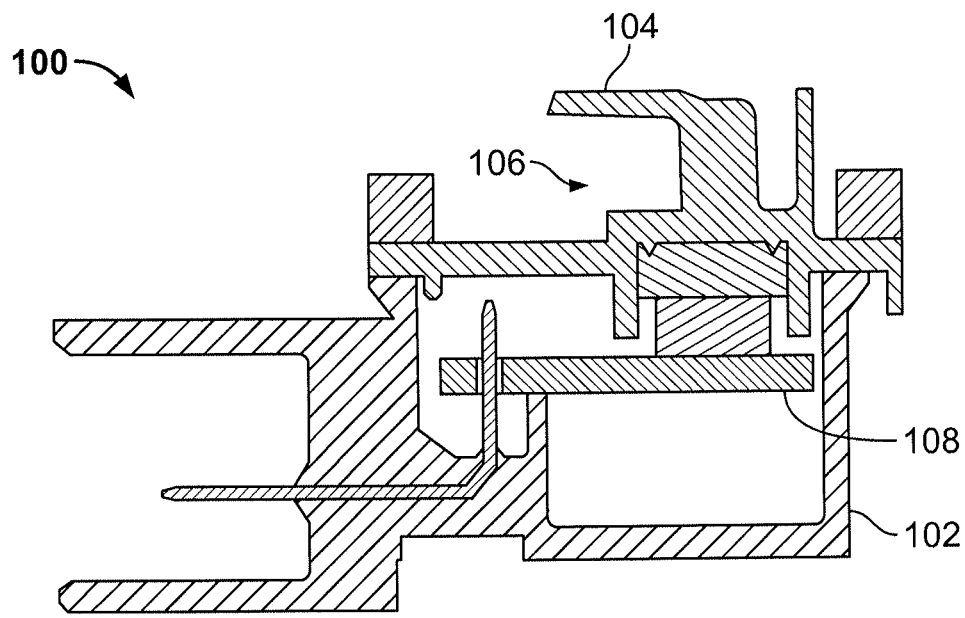
FIG. 1B depicts a cross-sectional view of the conventional pressure sensor assembly shown in FIG. 1A.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Figure 2:
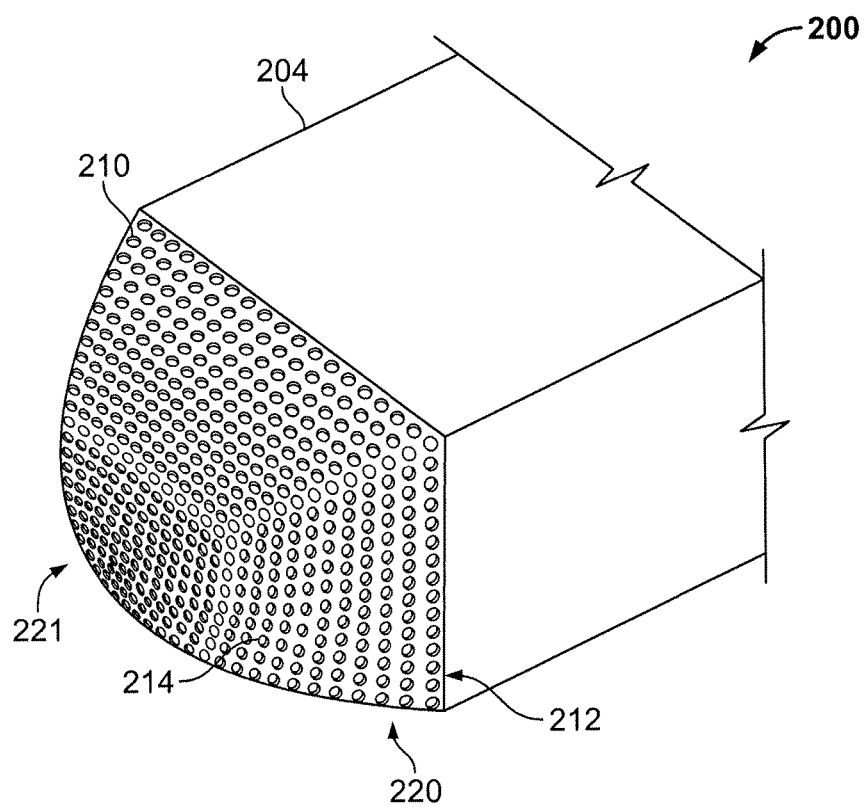
FIG. 2 depicts a perspective view of an example pressure sensor assembly including a shield coupled to a nozzle of the pressure sensor, according to embodiments.

FIG. 2 is a partial view of an example pressure sensor assembly 200 for housing a pressure sensor (not shown), such as crash sensors for detecting side impacts on a vehicle, according to embodiments. The pressure sensor assembly 200 may be similar to the pressure sensor assembly 100 and may include a pressure sensor nozzle 204 that is substantially similar to the nozzle 104. However, unlike the conventional pressure assembly 100, the pressure sensor assembly 200 further includes a permeable shield 210 (also referred to herein as a "cover" or "nozzle cover") that is coupled to the nozzle 204 so as to prevent foreign objects, such as ants, other insects, debris, and the like, from entering the nozzle 204, and ultimately, the pressure sensor. As shown in FIG. 2, the shield 210 encloses or covers an open end 212 (also referred to herein as an "opening") of the nozzle 204. An opposite end (not shown) of the nozzle 204 is coupled to a pressure sensor housing (such as the housing 102) to permit airflow from the nozzle 204 into the housing and towards sensing circuitry (such as the PCB 108) included therein.

According to embodiments, the pressure sensor may have a predetermined airflow rate, which is the minimum amount of airflow required through the nozzle 204 to produce effective pressure changes that can be measured by the pressure sensor and transmitted as electronic signals. If the airflow rate of the pressure sensor drops below the predetermined airflow rate (e.g., due to ant infestation blocking the nozzle opening 212), the pressure sensor performance degrades as well. For example, in crash sensors, airflow restrictions within the nozzle 204 may affect sensor performance. In embodiments, each type of pressure sensor may have a different predetermined airflow rate depending on the specific characteristics of the pressure sensor and/or the environment in which it is located. For example, as will be appreciated, the mass airflow rate for a given element can be calculated using Equation 1.

$$\text{Mass Airflow Rate} = \text{Density} * \text{Velocity} * \text{Area} \quad \text{Equation 1:}$$

Accordingly, in embodiments, the predetermined airflow rate for a given pressure sensor can depend on the available spatial area at the pressure sensor's location within the vehicle or equipment (e.g., to calculate Velocity), an operating temperature of the pressure sensor and/or the surrounding environment (e.g., to calculate Density), and the sizes and geometries of the nozzle 204 and its open end 212 (e.g., to calculate Area).

According to embodiments, the shield 210 can include a plurality of openings 214 within a surface of the shield 210 to permit an optimal amount of airflow into the nozzle 204. In such embodiments, the total mass airflow rate for the shield 210 may be calculated using Equation 2, which includes computing a sum total of the velocity and area of each opening 214.

$$\text{Total Mass Airflow Rate} = \text{Density} * \Sigma(\text{Velocity}(i) * \text{Area}(i)) \quad \text{Equation 2:}$$

Figure 3A:
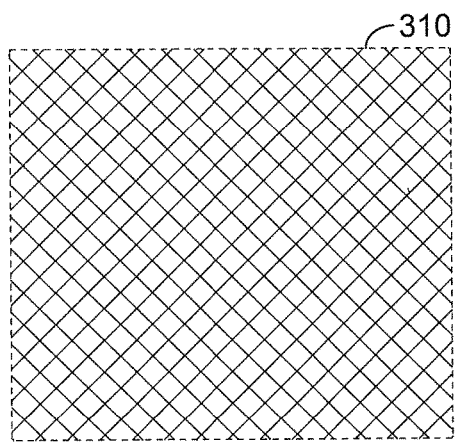
FIG. 3A depicts a detailed view of an example shield, according to embodiments.
Figure 3B:
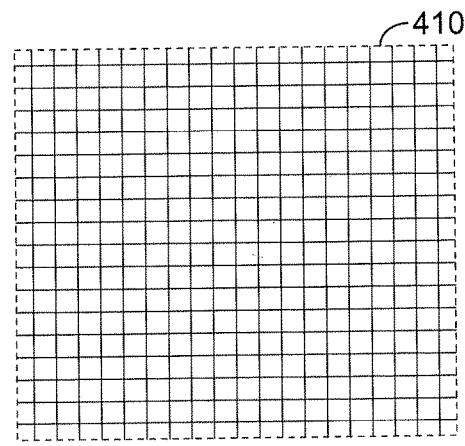
FIG. 3B depicts a detailed view of another example shield, according to embodiments.

A size, shape, number, and/or positioning of the plurality of openings 214 can be specifically selected to achieve the predetermined airflow rate required for proper sensor performance, while still keeping foreign objects out of the nozzle 204. For example, in embodiments, each of the openings 214 has a diameter or width that is at least smaller than the width of an ant (e.g., less than 1.5 mm) in order to prevent ants from entering the nozzle 204 through the openings 214. In some embodiments, the shield 210 includes a number of openings 214 dispersed across the surface of the shield 210 in a regular or irregular pattern. In other embodiments, the shield 210 comprises a mesh screen or net with a mesh or opening size of less than 1.5 mm. According to embodiments, any of a number of different mesh patterns and/or screen types may be used for the shield 210. In FIG. 2, the shield 210 is shown as having a pattern of circular openings 214. As another example, FIG. 3A shows a partial detailed view of an exemplary shield 310 with a diamond-shaped mesh pattern. And in yet another example, FIG. 3B shows a partial detailed view of an exemplary shield 410 with a square-shaped mesh pattern.

As shown in FIG. 2, the shield 210 forms a three-dimensional shape with an open end 220 configured to fit onto the open end 212 of the nozzle, and an opposing end 221 configured to extend out or away from the nozzle 204. In embodiments, the three-dimensional shape of the shield 210 can allow a greater amount of airflow to enter the nozzle 204 than, for example, a flat or planar shield 210. Specifically, due to the three-dimensional shape, a larger surface area of the shield 210 surrounds the nozzle opening 212, which presents a greater number of openings 214 for permitting airflow into the nozzle 204. Accordingly, in embodiments, the total surface area of the shield 210 and the exact size and number of the openings 214 can be co-related and dependent on the predetermined airflow rate, as well as an expected size of potential foreign objects, as discussed above. For example, to achieve a given predetermined airflow rate, the shield 210 could have a smaller surface area and a fewer number of large-sized openings 214. Alternatively, the shield 210 could achieve the same predetermined airflow rate by having a larger surface area and a greater number of small-sized openings 214.

The exact shape of the shield 210 can vary according to embodiments. In the embodiment shown in FIGS. 2 and 4-7, the shield 210 is depicted as having a rounded, dome-like shape. In other embodiments, the shield 210 can form any three-dimensional shape that can fit onto the nozzle opening 212, including, for example, a sphere or hemisphere, an ellipsoid or half-ellipsoid, a cylinder or half-cylinder (see, e.g., FIG. 8), a cube, a square prism or any other type of prism. Further, according to embodiments, the shield 210 may be composed of plastic, metal, or any other suitable material that has an appropriate environmental resistance, including, for example, against vibrations and temperature variations, and is sufficiently sturdy to prevent deformation of the shield 210.

In some cases, regardless of the above-described configuration options, the mere addition of the shield 210 at the open end 210 of the nozzle 204 may change the airflow rate within the nozzle 204. Typically, this change in airflow is not significant enough to affect sensor performance. Nevertheless, in some cases, a size of the nozzle 204 may be increased to calibrate for airflow changes caused by the addition of the shield 210. For example, the open end 212 of the nozzle 204 may be increased in size in order to account for the change in airflow. Alternatively, or in addition, the predetermined airflow rate for the nozzle 204 may be calibrated to account for airflow changes caused by the shield 210. For example, the predetermined airflow rate may be increased in order to account for the change in airflow, and the openings 210 and shape of the shield 210 may be configured according to the increased airflow rate.

Figure 4:
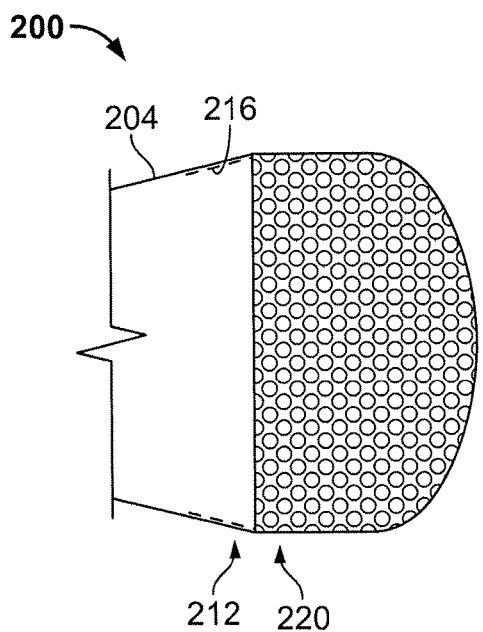
FIG. 4 depicts the pressure sensor assembly shown in FIG. 2 with an example mechanism for coupling the shield to the nozzle, according to embodiments.

In embodiments, the shield 210 may be attached to the nozzle 204 at the opening 212 using any of a number of different attachment mechanisms or techniques. In some cases, the attachment mechanism may be adapted to conform to, or selected based on, the particular type of pressure sensor, or more specifically, a size and geometry of the nozzle opening 212. FIGS. 4-7 illustrate a number of example attachment mechanisms according to embodiments. However, the illustrated embodiments do not form an exhaustive list of attachment mechanisms, and other mechanisms may be used in other embodiments in accordance with the principles described herein According to some embodiments, the shield 210 is formed from or onto the nozzle opening 212 during production of the pressure sensor assembly 200. For example, as shown in FIG. 4, a lead edge 216 of the shield 210 is inserted into an external surface of the nozzle 204 and using an overmolding technique, the shield 210 and the nozzle 204 are molded together to form a single part.

In other embodiments, the shield 210 can be coupled to the nozzle opening 212 using any of a number of different mechanical mechanisms or techniques. In some cases, the shield 210 can be externally coupled to the nozzle 204 to help avoid interference with the airflow path of the nozzle 204. In some cases, the shield 210 can be attached to existing pressure sensors, including, for example, crash sensors installed in a vehicle or stocked sensors awaiting installation.

Figure 5:
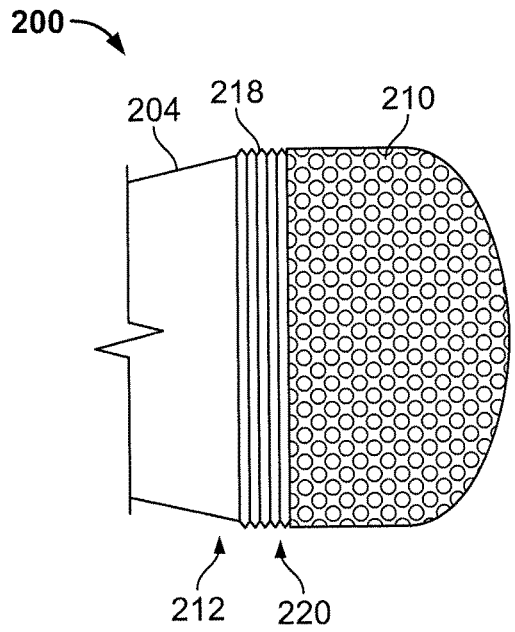
FIG. 5 depicts the pressure sensor assembly shown in FIG. 2 with another example mechanism for coupling the shield to the nozzle, according to embodiments.

As an example, FIG. 5 shows a threaded mechanism 218 for coupling the nozzle 204 to the shield 210. More specifically, in embodiments, the threaded mechanism 218 can include internal threads included on an open end 220 of the shield 210 and matching external threads included in the nozzle opening 212. The internal threads can be twisted into the external threads in order to attach the nozzle 204 to the shield 210. In some cases, the respective components of the threaded mechanism 218 may be added to the pressure sensor nozzle 204 and the shield 210 during production. In other cases, the external threads may be attached to the nozzle opening 212 after production in a retro-fitting process.

Figure 6:
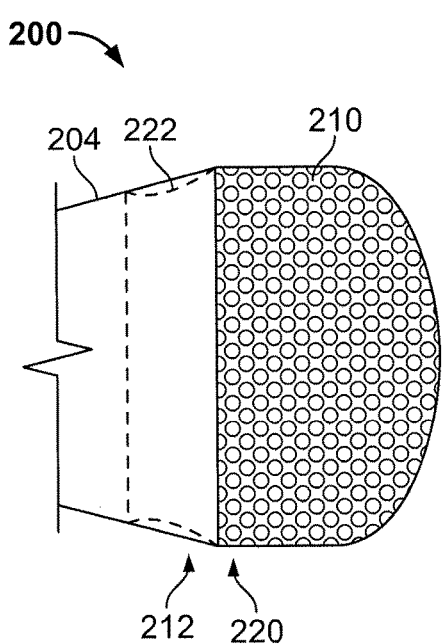
FIG. 6 depicts the pressure sensor assembly shown in FIG. 2 with yet another example mechanism for coupling the shield to the nozzle, according to embodiments.

As another example, FIG. 6 shows the nozzle 204 coupled to the shield 210 using a self-retention mechanism 222. More specifically, in embodiments, the self-retention mechanism 222 includes a plurality of reversal tension hooks that are pushed inwards as they are inserted into the nozzle 204, and then released once fully inserted. The tension hooks can include springs that induce enough force and tension to keep the shield 210 attached to the nozzle 204, as shown in FIG. 6. In some cases, because the tension hooks are included entirely on the shield 210, the self-retention mechanism 22 can be installed in existing pressure sensors, regardless of whether the sensor is already installed or in inventory.

Figure 7:
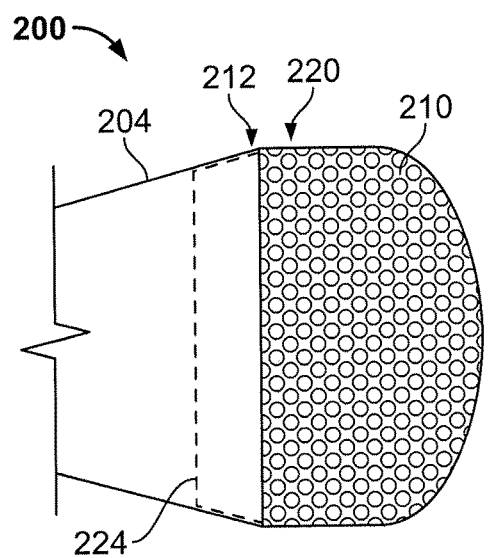
FIG. 7 depicts the pressure sensor assembly shown in FIG. 2 with still another example mechanism for coupling the shield to the nozzle, according to embodiments.

In the example shown in FIG. 7, an attachment mechanism 224 comprises a conical extension in the open end 220 of the shield 210, where the conical extension is shaped and sized for insertion into the open end 212 of the nozzle 204. The conical extension may be coupled to the nozzle 204 using any of a number of attachment techniques, including, for example, interference fit (also known as press fit or friction fit), adhesive, friction rotation, pushing fit, and/or heating. In some cases, because the conical extension is included entirely on the shield 210, the attachment mechanism 224 can be installed in existing pressure sensors, regardless of whether the sensor is already installed or in inventory.

Figure 8:
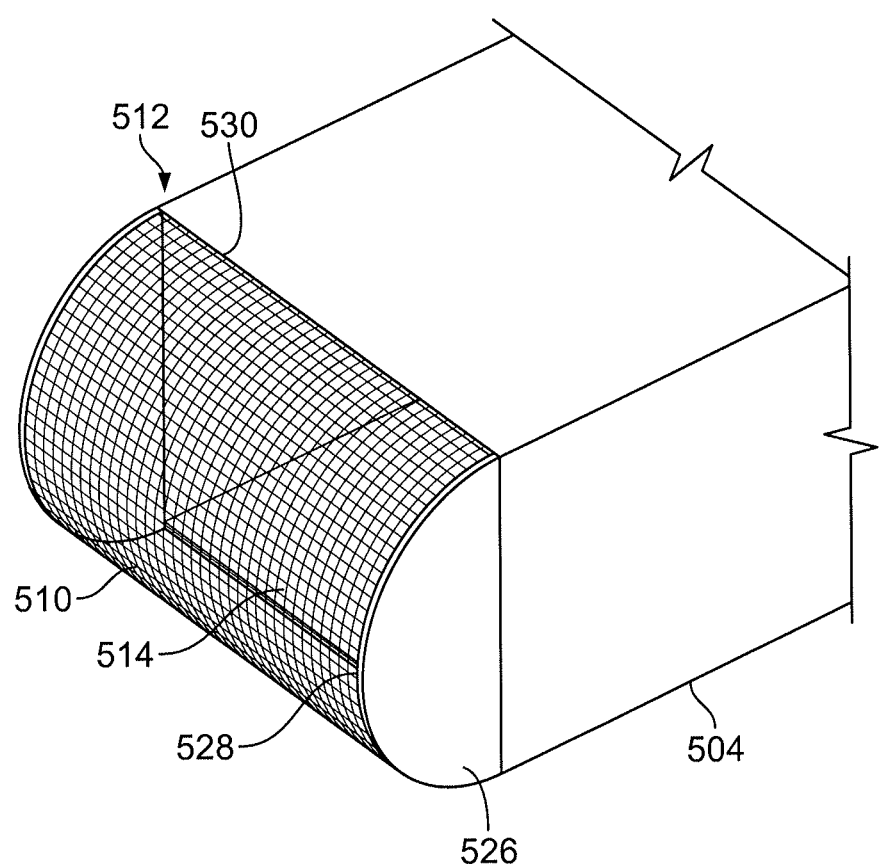
FIG. 8 depicts another exemplary pressure sensor assembly including a shield coupled to a pressure sensor nozzle, according to embodiments.

FIG. 8 is a partial view of an example pressure sensor assembly 500 for housing a pressure sensor (not shown), according to embodiments. Like the pressure sensor assembly 200, the pressure sensor assembly 500 includes a pressure sensor nozzle 504 coupled to a permeable gate 510 (also referred to herein as a "shield" or "cover"). The pressure sensor nozzle 504 may be substantially similar to the nozzle 204. And the gate 510 may be functionally similar to the shield 210. For example, the gate 510 prevents entry of foreign objects into the nozzle 504 and includes a plurality of openings 514 to permit an optimal amount of airflow through the nozzle 504 and to achieve a predetermined airflow rate, as required for proper pressure sensor performance. However, unlike the dome-shaped shield 210, the gate 510 has a half-cylindrical shape, as shown in FIG. 8. Also, the pressure sensor assembly 500 includes a pair of wings 526 extending from either side of the nozzle 504 for receiving the side edges 528 of the gate 510. The top and bottom edges 530 of the gate 510 may be coupled to an open end 512 of the nozzle 504. In embodiments, the gate 510 may be pushed or inserted between the wings 526 and attached to the wings 526 using, for example, studs, shafts, pins, adhesives, or any other suitable attachment mechanism. The gate 510 may be attached to the wings 516 in order to align the gate 510 with the nozzle 504, provide structural support, and/or prevent deformation. In the illustrated embodiment, the shield 510 is a net with a mesh size that is small enough to prevent entry of ants and other foreign objects. For example, the mesh size may be less than 1.5 mm.

Accordingly, embodiments described herein provide a pressure sensor assembly comprising a pressure sensor and a permeable cover for preventing entry of foreign objects into a nozzle of the pressure sensor. The cover includes a plurality of openings spread across a surface of the cover to permit an optimal amount of airflow into the nozzle to ensure proper pressure sensor performance. In embodiments, a size and number of the openings and an overall size and shape of the nozzle cover can be selected to permit at least a required airflow rate through the nozzle and into the housing, but also block foreign objects from entering the nozzle. As an example, the openings may be designed to be smaller than an expected size of an ant or other foreign object to prevent entry of such objects, and the required airflow rate may be achieved by forming the nozzle cover in a three-dimensional shape, which has a larger surface area and therefore, a larger number of openings for permitting airflow into the nozzle. Further, the nozzle cover can be adapted for attachment to any type of pressure sensor nozzle and in some cases, can be installed at any time, including during production and after installation. Thus, the embodiments described herein can effectively prevent entry of foreign objects into a pressure sensor nozzle without deteriorating pressure sensor performance or creating new failure modes.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A pressure sensor assembly, comprising:
a housing for a pressure sensor;
a nozzle coupled to the housing and defining an air passageway to permit airflow into the housing; and
a nozzle cover having a three-dimensional outer surface extending away from the air passageway defined by the nozzle and defining a plurality of surface openings that extend uniformly along an exposed portion of the three-dimensional outer surface to permit airflow through the air passageway.

2. The pressure sensor assembly of claim 1, wherein the three-dimensional outer surface substantially forms a half-cylinder.

3. The pressure sensor assembly of claim 1, wherein the three-dimensional outer surface substantially forms a hemisphere.

4. The pressure sensor assembly of claim 1, wherein the three-dimensional outer surface substantially forms an ellipsoidal.

5. The pressure sensor assembly of claim 1, wherein a size of the plurality of surface openings permits a predetermined airflow rate and prevents insects from entering the nozzle through the plurality of surface openings.

6. The pressure sensor assembly of claim 1, wherein the nozzle includes an open end and the nozzle cover includes an open end, wherein the open end of the nozzle cover is mechanically coupled to the open end of the nozzle.

7. The pressure sensor assembly of claim 6, wherein the open end of the nozzle cover is press fit into the open end of the nozzle to mechanically couple the nozzle cover to the nozzle.

8. The pressure sensor assembly of claim 6, wherein the open end of the nozzle cover is molded together with the open end of the nozzle to mechanically couple the nozzle cover to the nozzle.

9. The pressure sensor assembly of claim 1, wherein the nozzle cover is formed around an open end of the nozzle.

10. The pressure sensor assembly of claim 1, wherein the three-dimensional outer surface of the nozzle cover increases the airflow rate through the nozzle cover by increasing a surface area of the nozzle cover along which the plurality of the surface openings are defined.

11. An assembly for protecting a pressure sensor, comprising:
a shield comprising a mesh screen and enclosing a nozzle of the pressure sensor, the shield having a three-dimensional outer surface extending away from the nozzle and defining a plurality of surface openings that extend in a uniform pattern along an exposed portion of the three-dimensional outer surface to permit airflow into the nozzle; and
an attachment mechanism configured to couple the shield to an open end of the nozzle.

12. The assembly of claim 11, wherein a size of each of the plurality of surface openings permits a predetermined airflow rate and prevents insects from entering the nozzle through the plurality of surface openings.

13. The assembly of claim 11, wherein the three-dimensional outer surface substantially forms a half-cylinder, a hemisphere, or an ellipsoid.

14. The assembly of claim 11, wherein the attachment mechanism mechanically attaches an open end of the shield to an open end of the nozzle.

15. The assembly of claim 11, wherein each of the plurality of surface openings has a width of less than 1.5 millimeter (mm).

16. The pressure sensor assembly of claim 6, wherein the open end of the nozzle cover includes internal threads and the open end of the nozzle includes external threads, wherein the internal threads of the nozzle cover thread together with the external threads of the nozzle to mechanically couple the nozzle cover to the nozzle.

17. The pressure sensor assembly of claim 6, wherein the open end of the nozzle cover includes tension hooks that are configured to be inserted into the open end of the nozzle and released to mechanically couple the nozzle cover to the nozzle.

18. The assembly of claim 11, wherein the three-dimensional outer surface of the shield extends away from an air passageway defined by the nozzle.

19. A pressure sensor assembly, comprising:
a housing;
a pressure sensor housed in the housing and in communication with a restraint control module of a vehicle for airbag deployment;
a nozzle coupled to the housing and defining an air passageway to permit airflow into the housing, the nozzle includes an open end with external threads; and
a nozzle cover including:
an open end with internal threads that thread together with the external threads of the nozzle to mechanically couple the nozzle cover to the nozzle; and
a three-dimensional outer surface extending away from the nozzle and defining a plurality of surface openings that extend uniformly along an exposed portion of the three-dimensional outer surface and are configured to permit airflow through the air passageway of the nozzle and into the housing.

20. The pressure sensor assembly of claim 19, wherein the three-dimensional outer surface of the nozzle cover increases the airflow rate through the nozzle cover by increasing a surface area of the nozzle cover along which the plurality of the surface openings are defined.

* * * * *